2 Sheets—Sheet 1.
H. DUCSH.
Soft Dough Machine.
No. 209,963. Patented Nov. 19, 1878.
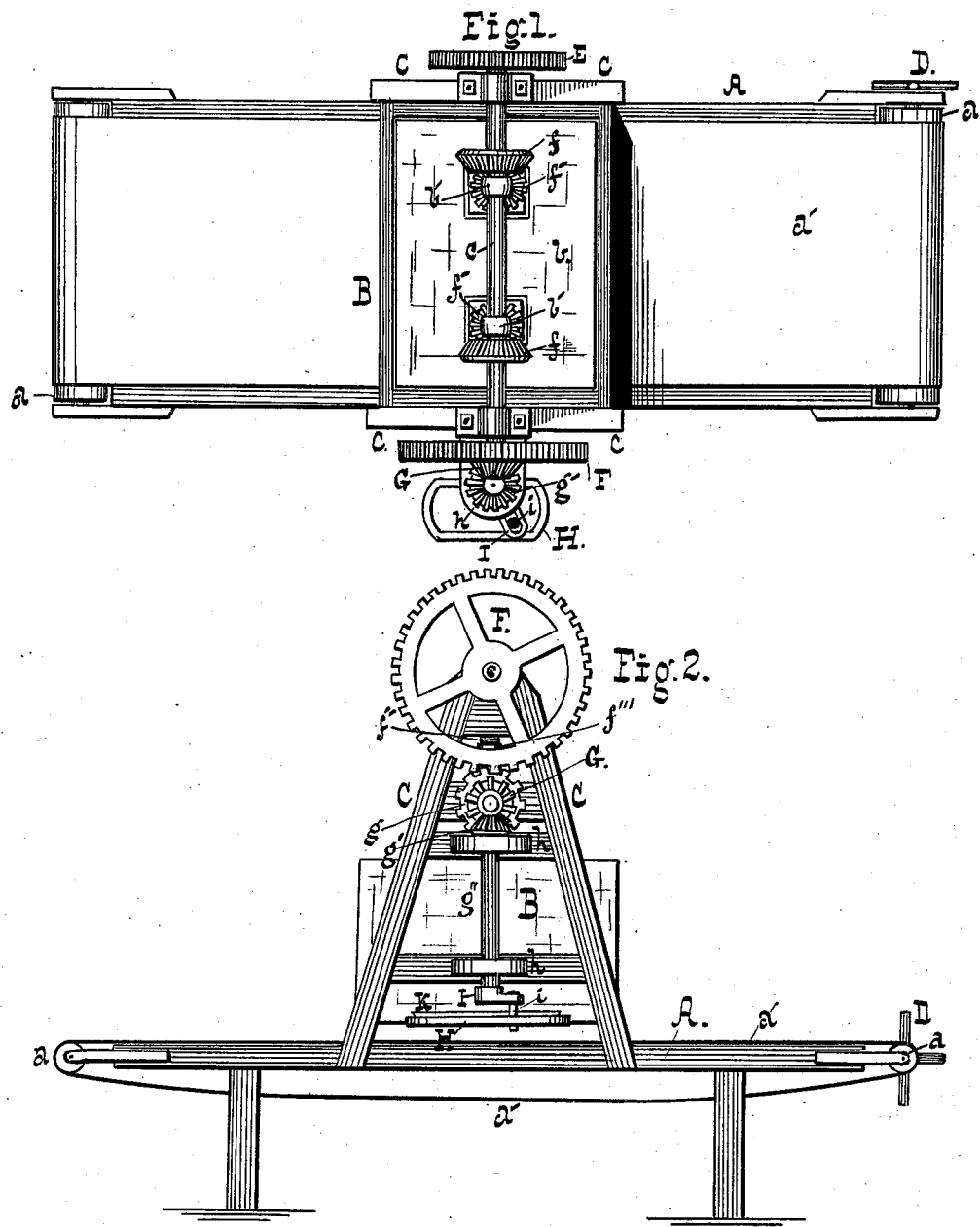

2 Sheets—Sheet 2.
H. DUCSH.
Soft Dough Machine.
No. 209,963. Patented Nov. 19, 1878.
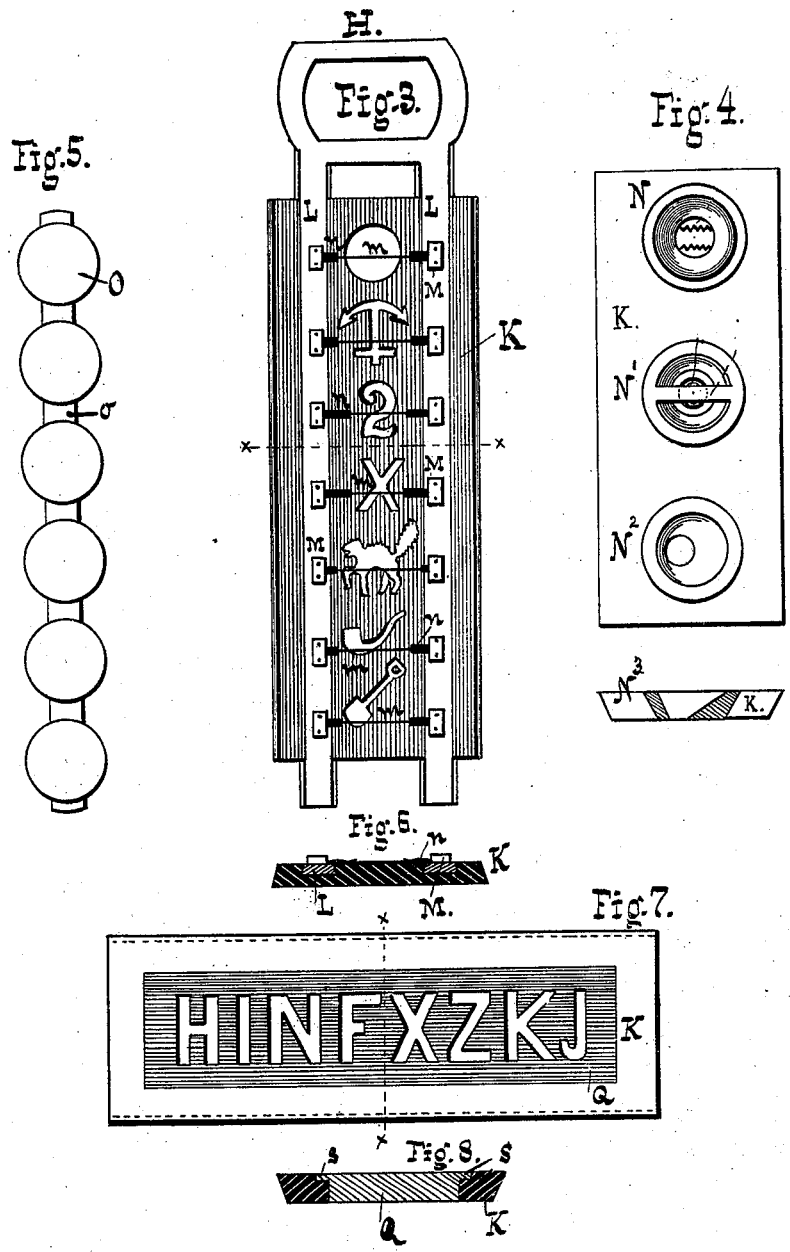

UNITED STATES PATENT OFFICE.

HENRY DUCSH, OF BALTIMORE, MARYLAND.

IMPROVEMENT IN SOFT-DOUGH MACHINES.

Specification forming part of Letters Patent No. 209,963, dated November 19, 1878; application filed September 3, 1878.

*To all whom it may concern:*

Be it known that I, HENRY DUCSH, of Baltimore city, State of Maryland, have invented certain new and useful Improvements in Soft-Dough Machines; and I hereby declare the same to be fully, clearly, and exactly described as follows, reference being had to the accompanying drawings, in which—

Figure 1 is a plan view of the machine; Fig. 2, a side elevation of the same; Fig. 3, a bottom plan of form-plate; Fig. 4, a plan and sectional view of the form-plate and interchangeable forms; Fig. 5, similar view of the device for closing orifices of form-plate; Fig. 6, cross-sectional view of Fig. 3 on line $x\,x$; Fig. 7, plan view (top) of modified form of form-plate; and Fig. 8, sectional view on line $x\,x$ of the latter.

My present invention relates to that class of machines in use for forming dough into cakes of various shapes ready for baking; and it consists in certain details of construction and combinations of parts, as hereinafter described and claimed.

Two species of machines for working dough into cakes are in general use. In one the dough is forced through apertures in a plate, and is severed by knives, which reciprocate under the apertures, the so-formed cakes being allowed to fall into pans ready for delivery to the ovens. In the other the dough is rolled into a sheet of appropriate thickness, and the cakes are formed by means of ordinary cutters. While the cakes produced by the latter class of machines are superior in appearance, the machines are comparatively slow and tedious in operation, as the sheet of dough must be carefully dusted with flour to prevent the adhesion of the cakes to the cutters. Besides, a large amount of scrap is left between the cakes, which must be carefully picked out and worked over.

Now, it is well known to bakers that it is desirable in the manufacture of snaps, jumbles, lady-fingers, and cakes of that description, to make use of a dough as soft as is compatible with the working of the machine, as the moisture of the dough being rapidly evaporated in the process of baking renders the cakes highly porous and light.

The object of my invention is to furnish a machine operating upon the reciprocating-knife principle, and possessing all the advantages in respect to the simplicity of construction and rapidity and effectiveness in operation of machines of that class, while still being competent to produce from soft dough cakes having the forms of natural objects, numerals, letters of the alphabet, &c.

All attempts to produce from soft dough alphabet cakes or other cakes having a definite and predetermined shape upon a knife-machine have heretofore failed, for the reason that the dough, if sufficiently moist to become properly light in baking, is too soft and tacky to admit of its being cut by means of the reciprocating knives heretofore used on such machines.

For want of a better term to characterize the knives I make use of in my machine, I designate them as "tape-wire" knives, by which I desire to be understood as meaning knives of the caliber of ordinary clock hair-springs, from one-fifteenth to one thirty-second inch wide, and thick in proportion. Such knives are so narrow as to cleanly sever even very soft dough without dragging, and their use results in the formation of cakes having almost the exact proportions of the orifices in the form-plate.

In the use of the device about to be described no difficulty whatever is experienced. Alphabet and numeral cakes may be formed thereby as clean-cut in outline as those heretofore produced by cutter-machines, and equal to them in every respect.

In the accompanying drawings, Figs. 1 and 2 represent what is known as a "Slote" machine embodying my improvements, though, as will be readily understood from the following description of my invention, it is by no means limited to use in connection with a Slote, being equally applicable to a Holmes or other machine of the same class.

A represents the frame of the machine, having at either end a roller, $a$, over which is stretched an apron, $a'$. Supports C C are secured at either side of the frame, within which is journaled the main driving-shaft $c$.

E is a gear-wheel on one end of this shaft, which actuates through suitable intermediate gearing (not shown) the apron $a'$. B is the box for the dough, securely bolted to the supports C C, a short distance above the apron $a'$, and provided with a plunger, $b$.

Upon the shaft $c$ are keyed bevel-gear wheels $f\ f$, which mesh with similar wheels $f'$ upon shafts $f''$. The latter are threaded, as shown, and enter tubular shafts $f'''$, which are secured to the plunger $b$. It is evident that upon rotating the shaft $c$ the plunger $b$ will be caused to rise or fall, as the case may be.

A wheel, F, is also secured upon the shaft $c$, and meshes with a spur-wheel, $g$, having a bevel-wheel, G, upon the same shaft. The wheel G meshes with a similar wheel, $g'$, upon the shaft $g''$, which latter is mounted in bearings $h\ h$.

To the lower end of the shaft $g''$ is keyed a crank, I, having a crank-pin, $i$, adjustable to or from the shaft, and adapted to engage with an eye, H, upon the end of the knife-bars L L.

K, Figs. 3 and 7, is the form-plate, having beveled edges, as shown, which dovetail into the bottom of the box B, the plate K being secured in place by means of set-screws or other equivalent device. The plate K is perforated in any suitable design, as shown in the drawings, or it may be provided with a series of circular orifices adapted to receive interchangeable forms N N¹ N², constructed to form, respectively, cream-bars, jumbles, or ladyfingers.

A pair of dovetail grooves run lengthwise of the plate K on its under side, within which slide the correspondingly-shaped knife-bars L L. Between these are stretched the knives $m$ $m$, constructed preferably of clock hair-spring steel, and firmly secured at their ends by blocks M M, screwed to the bars L L. Springs $n$ $n$ are also held by the blocks M and serve to press upon and hold the knives close to the under surface of the plate K.

Instead of the described construction of the plate K, I may make use of the form shown in Figs. 7 and 8, in which Q is a plate having the desired series of perforations and provided with a bead, $s$, on its edges. The plate K is cut out for the insertion of the plate Q, as shown in Fig. 8. By these means the design of the work may be readily and expeditiously altered by simply removing the plate Q and inserting the one bearing the desired design.

In Fig. 5 is illustrated a device used to close the orifices in the plate K or Q when the machine is not in operation—say, pending the filling of the box B; and it consists of a bar, $o$, bearing a series of pads, O, at the proper distance apart to cover the orifices in the form-plate. This device is simply laid upon the apron and passed under the box B to the proper distance to cover the openings referred to.

The operation of the device is as follows: The box B being filled with dough of the proper consistency and a series of baking-pans being laid upon the apron $a'$, the machinery is set in motion. As the plunger descends the dough is forced through the orifices in the plate K or Q, and the knives $m$ $m$ reciprocating thereunder cut off the cakes, which fall into the pans ready for delivery to the oven.

D is a handle upon the shaft of one of the rollers $a$, whose function is as follows: As the attendant perceives that at the ordinary speed of the apron a line of cakes would fall upon the joint of a pair of baking-pans, he starts the apron slightly ahead or retards it slightly by a partial turn of the handle D.

The operations of the various gear-wheels and shafts are so evident as to render a further reference to them wholly unnecessary.

I am aware that it is not new, broadly, to cut dough by means of a round wire, and such I therefore do not claim, the gist of my invention consisting in the use of a tape-wire knife.

I desire, finally, to be understood as specifically disclaiming the use of any or all of the devices heretofore in use upon snap or hard-dough machines, such as shown in Patent No. 91,759, June 22, 1869.

Having thus described my invention, what I claim as new, and desire to secure by Letters Patent, is—

1. In a soft-dough machine, and in combination with mechanism for forcing the dough through perforations in a form-plate, one or more tape-wire knives arranged to reciprocate contiguously over the said plate, as set forth.

2. In a soft-dough machine, a form-plate provided with a series of interchangeable forms, substantially as described.

3. In combination with the form plate, the knives $m$ and springs $n$ pressing upon and reciprocating with the knives, substantially as described.

HENRY DUCSH.

Witnesses:
R. D. WILLIAMS,
W. C. BARCLAY.